No. 870,683. PATENTED NOV. 12, 1907.
J. McCAUGHAN.
APPLE BOX PRESS.
APPLICATION FILED JUNE 14, 1906.

WITNESSES:
E. F. Stewart
J. A. Bishop.

James McCaughan, INVENTOR
By C. A. Snow & Co.
ATTORNEYS

UNITED STATES PATENT OFFICE.

JAMES McCAUGHAN, OF CANON CITY, COLORADO.

APPLE-BOX PRESS.

No. 870,683.

Specification of Letters Patent.

Patented Nov. 12, 1907.

Application filed June 14, 1906. Serial No. 321,728.

*To all whom it may concern:*

Be it known that I, JAMES McCAUGHAN, a citizen of the United States, residing at Canon City, in the county of Fremont and State of Colorado, have invented a new and useful Apple-Box Press, of which the following is a specification.

This invention has relation to apple box presses adapted to be used upon apple boxes at the time that the same are being packed with fruit for shipment.
The press is adapted to hold the cover of the box down tight against the body thereof in order that the cover may be nailed to the body of the box.

Figure 1:
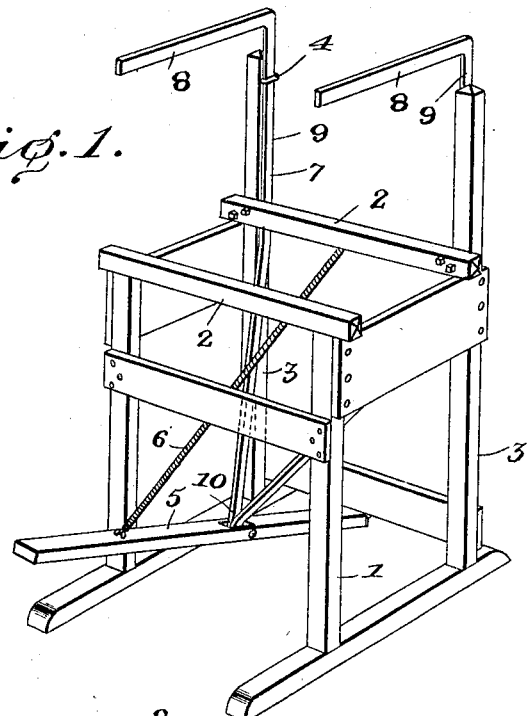
Figure 2:
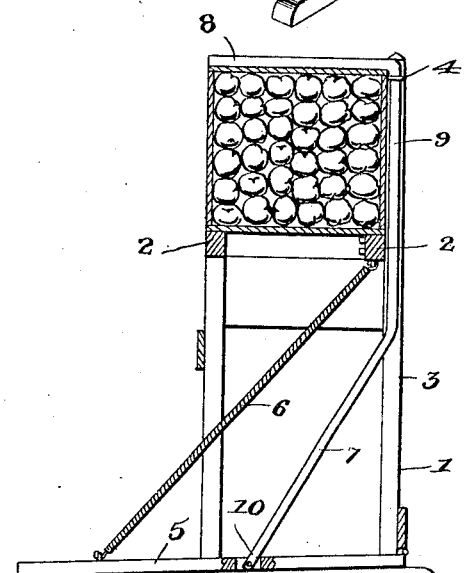

The novelty of the invention resides in the construction pointed out hereinafter.
In the accompanying drawing:—Figure 1 is a perspective view of the apple box press. Fig. 2 is a transverse sectional view of the apple box press.

The press consists of the stand 1 which is provided at its top with the horizontal parallel bars 2, 2. The rear upright members 3, 3 of the stand 1 extend above horizontal bars 2, 2, and are provided on their inner faces with the guides 4. The treadle is hinged to the lower portion of the stand 1 and the lower end of the coil spring 6 is fixed to said treadle. The upper end of said coil spring is fixed to the horizontal bar 2 located at the rear of the frame 1. The tension of the said spring 6 is such as to have a tendency to retain the free end of the treadle 5 in an elevated position.

The yoke 7 is provided with the horizontally extending arms 8, 8 which merge into the vertically extending portions 9, 9, the lower ends of which merge into the obliquely extending portion 10. The lower ends of the portions 10 are pivotally connected to the treadle 5.

The vertically extending portions 9, 9 of the said yoke pass through the guiding eyes 4, 4.

The operation of the apple box press is as follows: The box containing the apples is placed upon the horizontal bars 2, 2. The cover is then placed over the fruit and the operator places his foot upon the free end of the treadle 5 and depresses the same. This movement carries the said lever down against the tension of the coil spring 6 and moves the yoke 7 down. The horizontal portions 8, 8 of the said yoke bear down upon the top of the box and force the same down into closed contact with the sides of the box. The nails are then driven through the top of the box into the sides and thus the top is secured. The operator then removes his foot from the treadle 5 and the tension of the coil spring 6 comes into play to lift the parts which have been previously depressed.

Having described my invention, what I claim as new and desire to secure by Letters Patent is:—

An apple box press comprising a stand including box rests and standards extending above the rests and to which one of the latter is secured, guides carried by the opposed faces of the standards adjacent to their upper ends, bars held for sliding movements by the guides and having their upper portion bent to form horizontally-extending clamps, and the lower portions deflected inwardly and forwardly, a foot lever to which the lower ends of the bars are secured, and a spring connected with the lever and the stand.

In testimony that I claim the foregoing as my own, I have hereto affixed my signature in the presence of two witnesses.

JAMES McCAUGHAN.

Witnesses:
MARO S. GOODWIN,
W. A. CLEMENTS.